Oct. 25, 1932.  H. C. MIGNERY  1,884,078
LAND LEVELING MACHINE
Filed June 29, 1931  2 Sheets-Sheet 1

Inventor
H. C. Mignery
By Emil F. Lange
Attorney

Oct. 25, 1932.     H. C. MIGNERY     1,884,078
LAND LEVELING MACHINE
Filed June 29, 1931     2 Sheets-Sheet 2
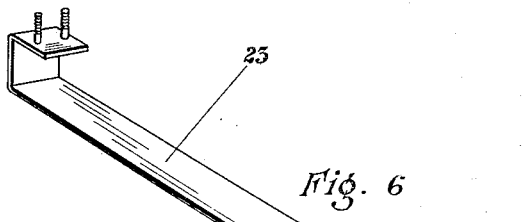
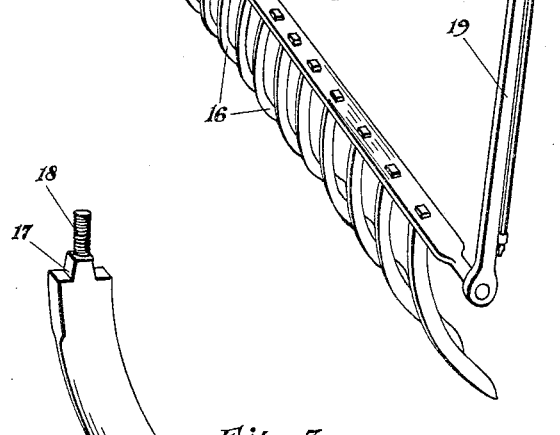
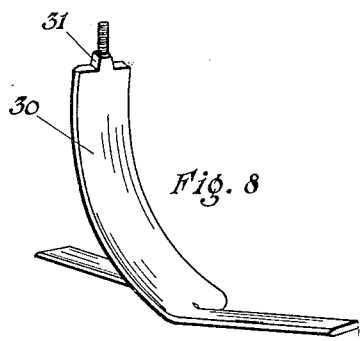
Inventor
H. C. Mignery
By Emil F. Lange
Attorney Patented Oct. 25, 1932

1,884,078

UNITED STATES PATENT OFFICE

HERBERT C. MIGNERY, OF ELGIN, NEBRASKA

LAND LEVELING MACHINE

Application filed June 29, 1931. Serial No. 547,634.

My invention relates to land leveling implements and especially to implements designed for cutting up sod hummocks preparatory to their removal.

The main object of the invention is the provision of an implement having means for cutting hummocks into vertical slices and also means for severing the entire hummock on a horizontal plane at its base.

Other objects will be brought out in the description of my land leveling implement.

Having in view these objects and others which will be pointed out in the following description, I will now refer to the drawings, in which Figure 1 is a plan view of my land leveling implement.

Figure 5 is a view in perspective of one of the turf slicers as it appears when removed from the implement.

Figure 6 is a perspective view of the hummock cutter employed in the Figure 1 construction.

Figure 7 is a view in perspective of one of the knives of the turf slicer.

Figure 8 is a perspective view of one of the hummock cutters of the type employed in the Figure 2 construction.

Figure 4:
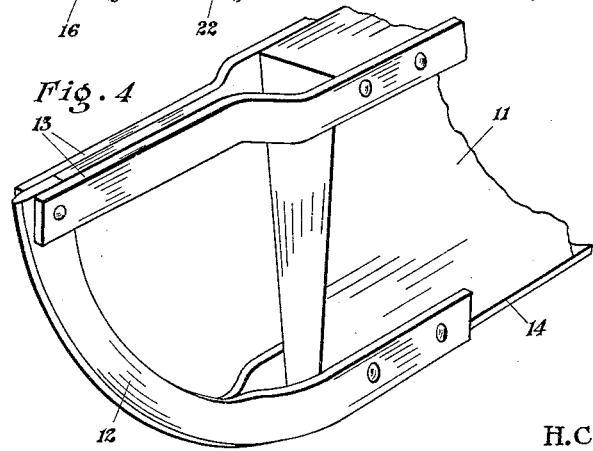
Figure 4 is a view in perspective of the front end portion of one of the runners.

The frame of the implement consists mainly of two runners 10 at opposite sides. The body portions 11 of these runners are preferably made from wood in wedge shape so as to reduce the friction against the soil. Two straps 12 of iron having the curved form shown in Figure 4 are secured at their bases to the runner body 11 while two other straps 13 connect the upper forward ends of the straps 12 with the upper edge of the body 11 of the runner. At the base of the runner is a strap 14 of iron, steel or the like. The forward edge of the strap 12 is beveled so as to provide a cutting edge. The frame is further braced not only by braces proper but also by the implement supports which connect the two runners. These, however, will be described in connection with the description of the tools themselves.

Near the forward extremity of the frame is a support 15 for a plurality of slicing knives 16. This assemblage is best shown in Figure 5 and the form of the knives is best shown in Figure 7. The individual knives 16 have square shanks 17 which fit into square holes in the support 15 and they are further provided with screw threaded end portions 18 for receiving nuts to hold the knives securely in position on the support 15. The knives are all beveled at their forward or convex edges. During the forward travel of the machine these knives 16 will pass through any hummocks in the field to cut the hummocks into vertical slices. In the travel to and from the field, however, it is desirable that the knives 16 assume an inoperative position and I have therefore provided a lever 19 cooperating with the rack 20 on the frame whereby the knives may not only be moved to inoperative position but whereby their position may be adjusted to increase their cutting action in various kinds of soil. In the rear of the support 15 is another support 21 having cutting tools 22 precisely like the support 15 with its cutting tools 16. It should be noted, however, that the cutting tools 22 are between the cutting tools 16 so that they split the slices formed by the cutting tools 16 and thus double the number of slices into which the hummocks are cut.

The hummocks or mounds which are sliced by the cutting tools 16 and 22 usually occur in hay land or in some cases in cultivated land. They are originally formed by ants or by other animals such as gophers which all throw up mounds of loose earth. These mounds then become covered with vegetation usually in the form of a dense mat of grass. Their fertility produces not only a dense mat above ground but it produces an even more dense mat of fine fibrous roots in the soil. It is a very difficult matter to employ haying implements on such land and the primary purpose of my invention is to provide an implement which performs the preliminary steps of leveling these mounds or hummocks. As thus far described, my implement will slice the mounds into vertical slices in the direction of the travel of the implement. A next step necessitates that the mound itself be severed from the soil and on substantially the level of the surface of the soil.

Figure 1:
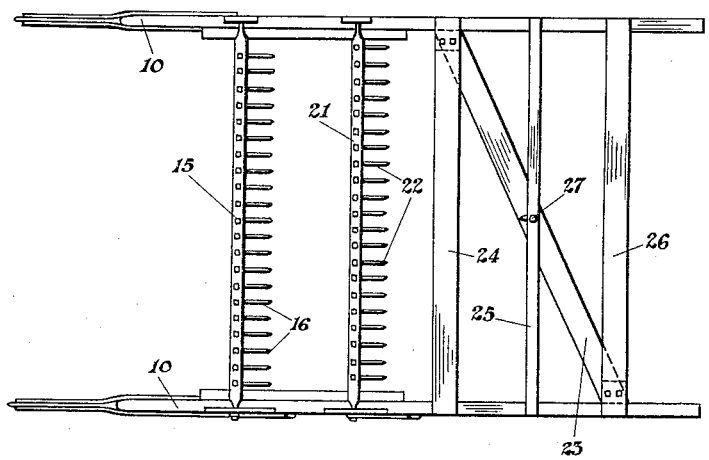
Figure 3:
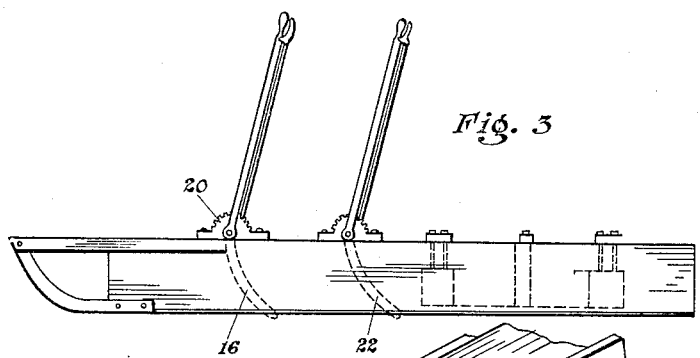
Figure 3 is a view in side elevation of the implement shown in Figure 1.

In the construction shown in Figures 1, 3, and 6, I employ a knife 23 in strap form having a horizontal position substantially on the level with the bottoms of the knives 16 and 22 and inclined with reference to the direction of travel of the implement. The knife is made of steel of suitable temper, its cutting edge being the forward edge. At its ends it has vertical supports which are inturned at their upper extremities. This knife follows the knives 16 and 22 but it travels through the base of the mound or hummock. The frame is braced at 24, 25 and 26 to withstand the strains to which it is subjected by the heavy work accomplished by the knife 23. The knife 23 is secured at one end to the extremity of the brace 24 and at the other end to the opposite extremity of the brace 26. The middle portion of the knife is supported from the brace 25 by means of any suitable support 27.

The position of the knife 23 is at all times substantially horizontal. If inclined with its cutting edge above the level of the rear edge, the knife would merely slice through the mound or hummock in a forward and upward direction. In some soils, however, and especially when the soil is in certain conditions, it is desirable that the knife be inclined slightly downward at its forward edge so as to give the desired suck to the knife. This inclination is at best only very slight as too much suck would carry the knife too deeply into the soil. It is also desirable that the knife 23 be so mounted that it may be elevated into inoperative position when going to and from the field. This may be done in numerous ways, one of my preferred constructions being shown in Figure 6 taken with Figure 1. The inturned end portions at the upper ends of the knife structure are provided with screws or bolts which pass upwardly through the braces 24 and 26 and which are adapted to receive nuts. By turning all of the nuts up or down equally, the knife 23 is elevated or lowered without altering its inclination. The suck may be increased by either turning the forward nuts so as to lower the cutting edge or by turning the rearward nuts so as to raise the rear edge of the cutting knife 23. The support 27 is also provided with a nut engaging the brace 25 but since this support is at or near the middle point of the knife 23, it need only be turned to compensate for the adjustments made by turning the end nuts.

Figure 2:
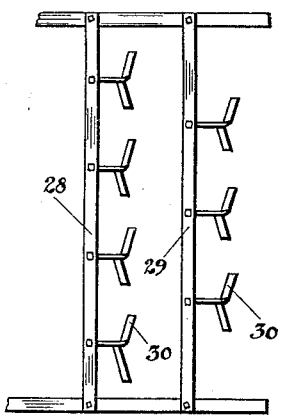
Figure 2 is a plan view of the rear portion of the land leveling implement but showing a modified form of the cutter.

While the knife 23 is my preferred construction for cutting through the base of the mound, it is obvious that numerous other constructions may be employed for accomplishing the same purpose. One of these constructions is shown in Figures 2 and 8. In this case two transverse braces 28 and 29 are employed and each of these braces is designed for supporting cutters 30 of the form shown in Figure 8. These cutters are formed from steel of suitable temper and curved roughly into the form of the cutters 16 or 22. On their forward convex edge they are beveled to give them a cutting action. The purpose of this cutting edge is not so much to supplement the work accomplished by the cutters 16 and 22 as it is to avoid entanglement of the fibrous grass roots as would occur if the edge were blunt. The lower portion of the cutter 30 is split as shown in Figure 8 and the two parts are turned in more or less of a horizontal direction but in opposite directions in V form and the forward edges of the two parts are beveled. It is these lower parts which are designed to cut through the base of the mound or hummock. The forward knives 30 accomplish the greater portion of this work but they are followed by the rear knives 30 which are offset with respect to the forward knives so that all roots in the mound or hummock are completely severed.

The knives 30 are secured to the braces 28 and 29 by means of square shanks 31 terminating in screw threaded end portions for receiving nuts, the arrangement being substantially identical with that for securing the knives 16 to their support 15.

When my implement as above described has gone over the field, the shape and the appearance of the hummocks is the same as before but the difference is that the hummocks have been sliced into shreds and severed from the soil. It is only necessary then to scatter out the different parts of the hummock to produce a level field. The most suitable implement for this purpose and the one in possession of every farmer is the harrow. The harrow carries the slices away from the hummock and it also tends to break up the individual slices and to scatter them over the surface of the soil. These broken up slices are subjected to the action of wind and rain so that they soon become incorporated with the top soil of the field to eventually leave the field in a perfectly level condition. The space occupied by the mounds or hummocks very quickly develops a growth of grass.

Having thus described my invention in such full, clear, and exact terms that its construction and operation will be readily understood by others skilled in the art to which it pertains, what I claim as new and desire to secure by Letters Patent of the United States is:

1. An implement for leveling fields having mounds or hummocks thereon, said implement including a frame, a knife support positioned transversely of said frame and adjustably secured thereto, a plurality of knives on said support for cutting the mounds or hummocks into vertical slices, and a diagonally disposed knife secured to said frame in substantially horizontal position in the rear of said knife support for severing the mounds or hummocks at their bases, said horizontally disposed knife being in strap form and having both of its end portions inturned into substantial parallelism with the blade portion thereof, each of said end portions being provided with front and rear upwardly projecting means for adjustable connection with said frame for adjustably raising or lowering said diagonally disposed knife or for adjustably raising or lowering the cutting edge thereof for altering its suck.

2. An implement for leveling fields having mounds or hummocks thereon, said implement including a frame, a knife support positioned transversely of said frame and adjustably secured thereto, a plurality of knives on said support for cutting the mounds or hummocks into vertical slices, and a diagonally disposed knife secured to said frame in substantially horizontal position in the rear of said knife support for severing the mounds or hummocks at their bases, said diagonally disposed knife being in strap form and having both of its end portions inturned into substantial parallelism with the blade portion thereof, a pair of fore and aft screw threaded pins projecting upwardly from each of said end portions, said frame being provided with apertures for receiving said pins, and nuts engaging said pins whereby the front edge or the rear edge of said diagonally disposed knife may be independently raised or lowered or whereby the entire diagonally disposed knife may be vertically adjusted or whereby said diagonally disposed knife may be tilted with one extremity thereof at a lower level than the other extremity.

3. An implement for leveling fields having mounds or hummocks thereon, said implement including a frame, a knife support positioned transversely of said frame, a plurality of depending knives on said support for cutting the mounds or hummocks into vertical slices, a diagonally disposed knife of strap form secured to said frame in substantially horizontal position in the rear of said knife support, fore and aft upwardly projecting screw threaded pins at each extremity of said diagonally disposed knife, said frame being provided with vertical apertures for receiving said pins, and nuts engaging said pins whereby the front edge or the rear edge of said diagonally disposed knife may be independently raised or lowered or whereby the entire diagonally disposed knife may be vertically adjusted or whereby said diagonally disposed knife may be tilted with one extremity thereof at a lower level than the other extremity.

In testimony whereof I affix my signature.

HERBERT C. MIGNERY.